(12) United States Patent
Hayashi et al.

(10) Patent No.: US 11,138,755 B2
(45) Date of Patent: Oct. 5, 2021

(54) ANALYSIS APPARATUS, ANALYSIS METHOD, AND NON TRANSITORY STORAGE MEDIUM

(71) Applicant: NEC CORPORATION, Tokyo (JP)

(72) Inventors: Haruyuki Hayashi, Tokyo (JP); Yusuke Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/628,485

(22) PCT Filed: Oct. 23, 2017

(86) PCT No.: PCT/JP2017/038132
§ 371 (c)(1),
(2) Date: Jan. 3, 2020

(87) PCT Pub. No.: WO2019/008789
PCT Pub. Date: Jan. 10, 2019

(65) Prior Publication Data
US 2020/0184674 A1 Jun. 11, 2020

(30) Foreign Application Priority Data
Jul. 4, 2017 (JP) .............................. JP2017-131088

(51) Int. Cl.
G06T 7/73 (2017.01)
G06T 7/00 (2017.01)

(52) U.S. Cl.
CPC .................. *G06T 7/73* (2017.01); *G06T 7/97* (2017.01); *G06T 2207/30201* (2013.01); *G06T 2207/30248* (2013.01)

(58) Field of Classification Search
CPC ... G06T 7/73; G06T 7/97; G06T 2207/30201; G06T 2207/30248; G06T 2207/30242;
(Continued)

(56) References Cited

U.S. PATENT DOCUMENTS

2009/0309974 A1  12/2009  Agrawal et al.
2012/0147194 A1   6/2012  Wang et al.
(Continued)

FOREIGN PATENT DOCUMENTS

JP   2012-128862 A   7/2012
WO  2014/061195 A1   4/2014
(Continued)

OTHER PUBLICATIONS

Communication dated Dec. 15, 2020 by the Japanese Patent Office in application No. 2019-528334.
(Continued)

*Primary Examiner* — Jerome Grant, II
(74) *Attorney, Agent, or Firm* — Sughrue Mion, PLLC

(57) ABSTRACT

According to the present invention, there is provided an analysis apparatus (10) including an image analysis unit (11) that detects a predetermined part of a vehicle and persons on the vehicle from each of a plurality of images obtained by imaging the same vehicle from different directions a plurality of times, and detects coordinates of each of the plurality of persons in a coordinate system having the detected predetermined part as a reference; a grouping unit (12) that groups the persons detected from the different images, on the basis of the coordinates; and a counting unit (13) that counts the number of groups.

14 Claims, 9 Drawing Sheets

(58) Field of Classification Search
CPC ...... G06T 2207/30268; G06K 9/00288; G06K 9/00838
See application file for complete search history.

(56) References Cited

U.S. PATENT DOCUMENTS

| | | | |
|---|---|---|---|
| 2014/0200759 A1* | 7/2014 | Lu .......................... | B60D 1/305 |
| | | | 701/28 |
| 2016/0239714 A1 | 8/2016 | Oami et al. | |
| 2018/0197218 A1* | 7/2018 | Mallesan ........... | G06K 9/00771 |
| 2018/0240180 A1* | 8/2018 | Glaser ................ | G06K 9/00771 |
| 2019/0294889 A1* | 9/2019 | Sriram ................ | G06K 9/6274 |
| 2020/0320287 A1* | 10/2020 | Porikli ............... | G06K 9/00718 |
| 2020/0331465 A1* | 10/2020 | Herman ............... | G05D 1/0276 |

FOREIGN PATENT DOCUMENTS

| | | | |
|---|---|---|---|
| WO | 2014/064898 A1 | 5/2014 | |
| WO | 2015/052896 A1 | 4/2015 | |

OTHER PUBLICATIONS

International Search Report for PCT/JP2017/038132 dated Jan. 16, 2018 (PCT/ISA/210).

* cited by examiner

FIG. 5

| FACE ID | COORDINATES | FRAME ID |
|---|---|---|
| A0001 | (··, ··) | F001 |
| A0002 | (··, ··) | F001 |
| ⋮ | ⋮ | ⋮ |

FIG. 6

| FACE ID | GROUP ID |
|---------|----------|
| A0001   | G01      |
| A0002   | G02      |
| ⋮       | ⋮        |

FIG. 9

| FACE ID | COORDINATES | FRAME ID | IN-FRAME COORDINATES |
|---|---|---|---|
| A0001 | (・・ , ・・) | F001 | (×・ , ・・) |
| A0002 | (・・ , ・・) | F001 | (×・ , ・・) |
| ⋮ | ⋮ | ⋮ | ⋮ |

ANALYSIS APPARATUS, ANALYSIS METHOD, AND NON TRANSITORY STORAGE MEDIUM

CROSS REFERENCE TO RELATED APPLICATIONS

This application is a National Stage of International Application No. PCT/JP2017/038132 filed Oct. 23, 2017, claiming priority based on Japanese Patent Application No. 2017-131088, filed Jul. 4, 2017, the disclosure of which is incorporated herein in its entirety.

TECHNICAL FIELD

The present invention relates to an analysis apparatus, an analysis method, and a program.

BACKGROUND ART

Patent Document 1 and 2 disclose apparatuses which detect the number of persons on a vehicle.

Patent Document 1 discloses an apparatus which detects a profile of a person by analyzing an image captured from the side of a vehicle and decides the number of persons on the vehicle on the basis of the detection result.

Patent Document 2 discloses an apparatus which detects persons by analyzing each of a plurality of images obtained by continuously capturing a vehicle, estimates which seat in the vehicle is taken by each detected person on the basis of how the vehicle looks in each image, and decides the number of persons on the vehicle on the basis of the number of seats that are determined to be seated.

RELATED DOCUMENT

Patent Document

[Patent Document 1] Pamphlet of International Publication No. WO2014/061195
[Patent Document 2] Pamphlet of International Publication No. WO2014/064898

SUMMARY OF THE INVENTION

Technical Problem

An object of the present invention is to provide a new technique for detecting the number of persons on a vehicle.

Solution to Problem

According to the present invention, there is provided an analysis apparatus including: an image analysis unit that detects a predetermined part of a vehicle and persons on the vehicle from each of a plurality of images obtained by imaging the same vehicle from different directions a plurality of times, and detects coordinates of each of the plurality of persons in a coordinate system having the detected predetermined part as a reference; a grouping unit that groups the persons detected from the different images, on the basis of the coordinates; and a counting unit that counts the number of groups.

According to the present invention, there is provided an analysis method executed by a computer, the method including: an image analysis step of detecting a predetermined part of a vehicle and persons on the vehicle from each of a plurality of images obtained by imaging the same vehicle from different directions a plurality of times, and detects coordinates of each of the plurality of persons in a coordinate system having the detected predetermined part as a reference; a grouping step of grouping the persons detected from the different images, on the basis of the coordinates; and a counting step of counting the number of groups.

According to the present invention, there is provided a program causing a computer to function as: an image analysis unit that detects a predetermined part of a vehicle and persons on the vehicle from each of a plurality of images obtained by imaging the same vehicle from different directions a plurality of times, and detects coordinates of each of the plurality of persons in a coordinate system having the detected predetermined part as a reference; a grouping unit that groups the persons detected from the different images, on the basis of the coordinates; and a counting unit that counts the number of groups.

Advantageous Effects of Invention

According to the present invention, a new technique for detecting the number of persons on a vehicle is realized.

BRIEF DESCRIPTION OF THE DRAWINGS

The foregoing and other objects, features and advantages will become more apparent from the following description of preferred example embodiments and the accompanying drawings.

FIG. 5 is a diagram schematically illustrating an example of data generated by the analysis apparatus of the present example embodiment.

FIG. 6 is a diagram schematically illustrating an example of data generated by the analysis apparatus of the present example embodiment.

FIG. 9 is a diagram schematically illustrating an example of data generated by the analysis apparatus of the present example embodiment.

DESCRIPTION OF EMBODIMENTS

First Example Embodiment

First, the outline of an analysis apparatus of the present example embodiment will be described. On the basis of the analysis result of each of a plurality of images obtained by continuously imaging the same vehicle, the analysis apparatus detects the number of persons on the vehicle.

First, the analysis apparatus detects a predetermined part of the vehicle and persons on the vehicle from each of a plurality of images obtained by imaging the same vehicle a plurality of times from different directions. Further, the analysis apparatus detects the coordinates of each of a plurality of persons in a coordinate system based on the detected predetermined part of the vehicle. Then, the analysis apparatus groups persons detected from different images, on the basis of the coordinates. The analysis apparatus collectively groups persons having coordinates close to each other. Then, the analysis apparatus counts the number of groups, and outputs the number of groups as the number of persons on the vehicle.

According to the analysis apparatus of the present example embodiment described above, a new technique for detecting the number of persons on a vehicle is realized. Further, in the case of the analysis apparatus according to the present example embodiment, "for each detected face, the coordinates in a two-dimensional coordinate system having a detected predetermined part of a vehicle as an origin may be detected, and faces having coordinates close to each other may be grouped", so it is not necessary to detect "seat where each detected person is sitting" as the technique disclosed in Patent Document 2. The seating layout in a vehicle differs depending on the vehicle and the vehicle type, and when the information on the seating layout held in advance is used, the accuracy of detecting the number of occupants may not be sufficient. According to the analysis apparatus of the present example embodiment, the accuracy of detecting the number of occupants is improved as compared with the technique disclosed in Patent Document 2.

Hereinafter, the configuration of the analysis apparatus will be described in detail. First, an example of a hardware configuration of the analysis apparatus will be described. Each functional unit included in the analysis apparatus of the present example embodiment is realized by any combination of hardware and software, mainly using a central processing unit (CPU) of any computer, a memory, a program to be loaded into the memory, and a storage unit such as a hard disk storing the program (can store programs stored in advance in the stage of shipping the apparatus, and also store programs downloaded from a storage medium such as a compact disc (CD) or a server on the Internet), and a network connection interface. Those skilled in the art will understand that there are various modifications in the realization methods and apparatuses.

Figure 1:
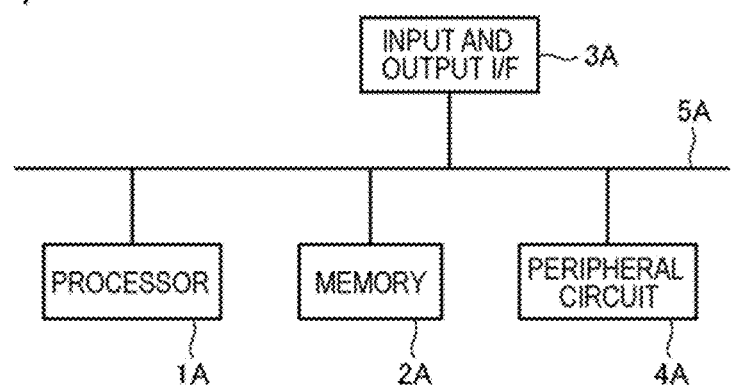
FIG. 1 is a diagram illustrating an example of a hardware configuration of an analysis apparatus of a present example embodiment.

FIG. 1 is a block diagram illustrating a hardware configuration of an analysis apparatus of the present example embodiment. As illustrated in FIG. 1, the analysis apparatus includes a processor 1A, a memory 2A, an input and output interface 3A, a peripheral circuit 4A, and a bus 5A. The peripheral circuit 4A includes various modules. It should be noted that, the analysis apparatus may be configured by a plurality of devices that are physically and/or logically separated. In this case, each of the plurality of devices includes the processor 1A, the memory 2A, the input and output interface 3A, the peripheral circuit 4A, and the bus 5A.

The bus 5A is a data transmission path through which the processor 1A, the memory 2A, the peripheral circuit 4A, and the input and output interface 3A mutually transmit and receive data. The processor 1A is, for example, an arithmetic processing apparatus such as a central processing unit (CPU) or a graphics processing unit (GPU). The memory 2A is, for example, a memory such as a random access memory (RAM) or a read only memory (ROM). The input and output interface 3A includes an interface for acquiring information from an input device (for example, a keyboard, a mouse, a microphone, a physical key, a touch panel display, and a code reader), an external apparatus, an external server, an external sensor, and the like, and an interface for outputting information to an output device (for example, a display, a speaker, a printer, and a mailer), an external apparatus, an external server, and the like. The processor 1A can issue a command to each module and perform a calculation based on the calculation results.

Figure 2:
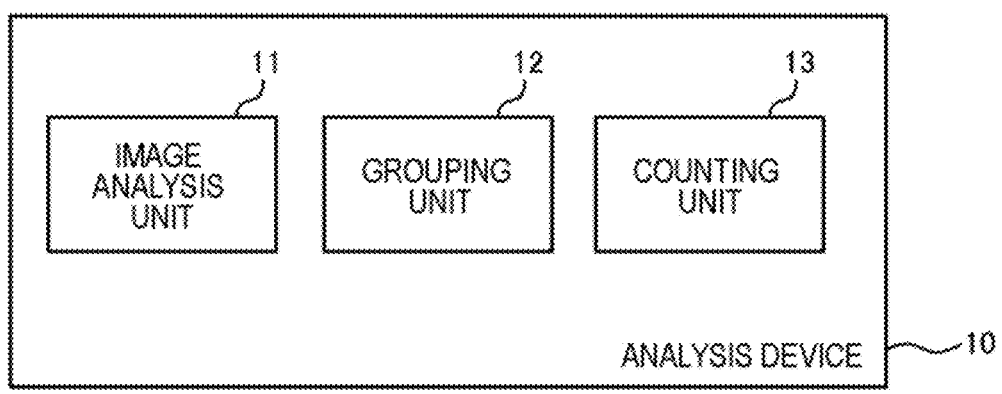
FIG. 2 is an example of a functional block diagram of the analysis apparatus of the present example embodiment.

Next, the functional configuration of the analysis apparatus will be described. FIG. 2 shows an example of a functional block diagram of the analysis apparatus 10. As illustrated, the analysis apparatus 10 includes an image analysis unit 11, a grouping unit 12, and a counting unit 13.

The image analysis unit 11 detects a predetermined part of the vehicle and persons on the vehicle from each of a plurality of images obtained by imaging the same vehicle a plurality of times from different directions. It should be noted that, in the present example embodiment, a human face is detected. Then, the image analysis unit 11 detects the coordinates of each of a plurality of detected faces in a two-dimensional coordinate system having the detected predetermined part of the vehicle as a reference (for example, origin). Hereinafter, the two-dimensional coordinate system having a detected predetermined part of a vehicle as an origin may be referred to as a "vehicle coordinate system".

Figure 3:
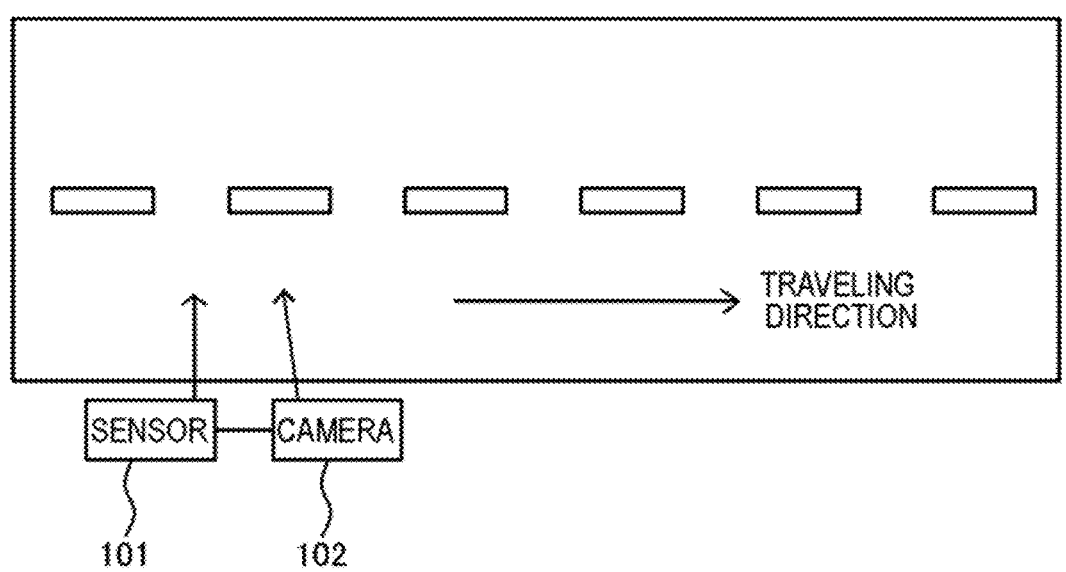
FIG. 3 is a diagram for explaining an example of an image capturing method of the present example embodiment.

First, an example of a configuration for generating a plurality of images processed by the image analysis unit 11 will be described. As shown in FIG. 3, a sensor 101 and a camera 102 are installed along the road through which the vehicle passes.

The sensor 101 detects that the vehicle has passed a predetermined position on the road. The details of the sensor 101 are not limited as long as such detection can be realized. For example, the sensor 101 may include a means that emits light (for example, laser) in a predetermined direction (for example, the direction of an arrow in the drawing) and a means that receives the reflected light. Then, the passage of the vehicle may be detected by detecting the presence of an obstacle that hinders the progress of the emitted light on the basis of the light receiving condition of the reflected light. In addition, it may be detected that the vehicle has passed through a predetermined position with a weight sensor or the like. When the sensor 101 detects that the vehicle has passed through a predetermined position on the road, the sensor 101 inputs a signal indicating that fact to the camera 102.

When the passage of the vehicle is detected by the sensor 101, the camera 102 captures an image in response to the detection. For example, the camera 102 may continuously capture a predetermined number of still images in response to the detection by the sensor 101 (for example, about several tens to a hundred images per second) to generate a plurality of still image files. In addition, the camera 102 may capture a moving image for a predetermined imaging time in response to detection by the sensor 101 to generate a moving image file consisting of a plurality of frames. The predetermined number and the predetermined imaging time can be arbitrarily determined in advance according to the specification of the camera 102, the moving speed of the vehicle, and the like. The position and orientation of the camera 102 are set so as to capture the vehicle detected by the sensor 101 by capturing in response to detection by the sensor 101.

The image file generated by the camera 102 is input to the analysis apparatus 10 by real time processing or batch processing. The analysis apparatus 10 and the camera 102 may be configured to be able to communicate with each other by any communication means.

Returning to FIG. 2, the image analysis unit 11 sets a plurality of images obtained by imaging the same vehicle as processing targets and detects the vehicle and a human face from each of the plurality of images. For example, in response to one detection by the sensor 101, a predetermined number of still images captured by the camera 102 or a moving image for a predetermined imaging time can be processed.

Detecting vehicles and human faces may be realized by template matching. Further, it may be realized by a detector constructed by machine learning using a large number of images. As the detector, for example, a support vector machine (SVM), a linear discriminant analysis (LDA), a generalized learning vector quantization (GLVQ), a neural network, or the like can be used.

It should be noted that, the human face to be detected may be the face of the person in the detected vehicle, that is, the face inside the detected outline of the vehicle. In this way, it is possible to detect only the faces of persons on the vehicle and to exclude the face of a person such as a passerby or a traffic guide who is outside the vehicle from the detection target.

After detecting the vehicle from each of the plurality of images, the image analysis unit 11 detects the predetermined part and predetermined directions of the detected vehicle from each of the plurality of images. Then, a two-dimensional coordinate system (vehicle coordinate system) in which the detected predetermined part is the origin and the detected predetermined directions are the x-axis direction and the y-axis direction is defined for each image.

Figure 4:
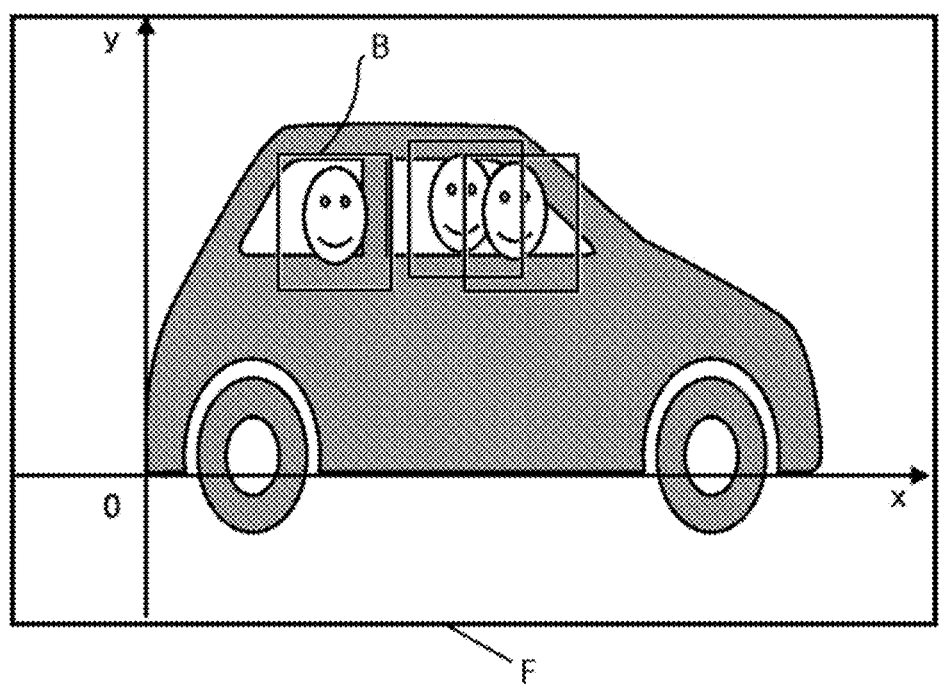
FIG. 4 is a diagram for explaining an example of a vehicle coordinate system of the present example embodiment.

An example of the predetermined part and the predetermined directions will be described, but is not limited thereto. FIG. 4 shows an example of a vehicle coordinate system set for one image F. In the illustrated example, the rear end portion of the bumper attached to the back of the vehicle body is used as a predetermined part, and the longitudinal direction and height direction of the vehicle are used as predetermined directions. A vehicle coordinate system is set in which the rear end portion of the bumper is the origin, the longitudinal direction of the vehicle is the x axis, and the height direction is the y axis.

After setting the vehicle coordinate system for each image, the image analysis unit 11 detects the coordinates of the human face detected from each image. In the present example embodiment, the coordinates of each of a plurality of faces can be obtained by a method according to how a human face is detected.

For example, in the human face detection processing, in a case where an area B where a human face exists is detected as shown in FIG. 4, representative points of the area B (for example, center, upper right, upper left, lower right, lower left, or the like) can be obtained as the coordinates of the face existing in the area B. In addition, in the human face detection processing, in a case where a human's eyes, nose, mouth, or the like are detected, the coordinates of the eyes, nose, mouth (for example, representative coordinates of the area occupied by the eyes, nose, mouth) can be obtained as the coordinates of the face having the eyes, nose, mouth.

An analysis result as shown in FIG. 5 is obtained by the image analysis by the image analysis unit 11. In FIG. 5, a "face identifier (ID)" for identifying each of a plurality of faces detected from a plurality of images, "coordinates" in the vehicle coordinate system of each of the plurality of faces, and a "frame ID" for identifying an image in which each face is detected are associated with each other.

When the same person's face exists across a plurality of images, different face IDs are assigned to the same person's faces detected from the plurality of images. The grouping unit 12 to be described below groups a plurality of face IDs attached to the same person's face.

Returning to FIG. 2, the grouping unit 12 groups a plurality of persons detected from a plurality of images, on the basis of the coordinates in the vehicle coordinate system. In the present example embodiment, the grouping unit 12 groups a plurality of faces detected from a plurality of images, on the basis of the coordinates in the vehicle coordinate system.

Figure 6:
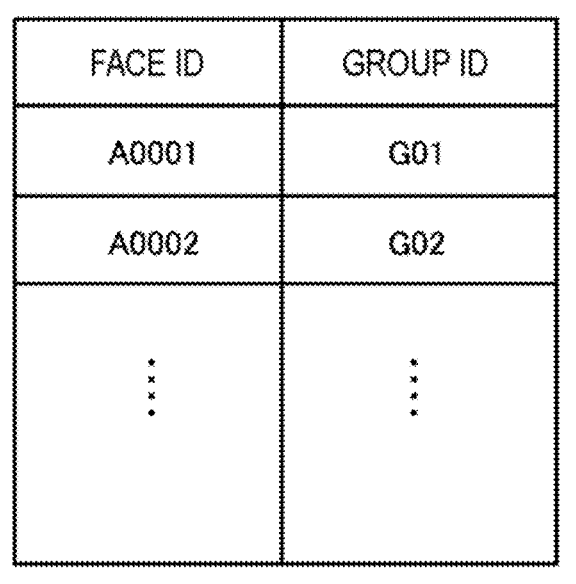

The grouping unit 12 groups persons detected from different images, on the basis of the coordinates. The grouping unit 12 groups together persons having coordinates close to each other in the vehicle coordinate system. For example, the grouping unit 12 can group a plurality of faces detected from a plurality of images using distances between coordinates. As a result, for example, data as shown in FIG. 6 is obtained. The obtained data may be stored in a storage medium such as a memory. In the data shown in FIG. 6, each of a plurality of faces detected by the image analysis unit 11 is associated with the ID of the group to which each face belongs. Further, the same group ID is associated with the face IDs of faces having coordinates close to each other in the vehicle coordinate system. Hereinafter, a grouping method is exemplified, but grouping may be performed by other methods.

"Method 1"

The grouping unit 12 causes one or more faces detected from the first image that is the image to be processed first (for example, the first captured image) among the plurality of images to be processed to belong to different groups. For example, a different group ID is associated with the face ID of each face detected from the first image and stored in a storage medium such as a memory. In a case where M faces (M is an integer equal to or greater than 1) are detected from the first image, the grouping unit 12 generates M groups, and causes each of the M faces to belong to each group. For example, M new group IDs are generated, and a different group ID is associated with the ID of each of the M faces detected from the first image (see FIG. 6).

Thereafter, the grouping unit 12 computes a distance between the coordinates of each of the one or more faces detected from the first image and the coordinates of each of one or more faces detected from the second image captured immediately after the first image. Then, the grouping unit 12 causes the faces of the two persons to be compared to belong to the same group, according to the comparison between the computed distance and a predetermined value. For example, in a case where the distance condition that the computed distance is less than a predetermined value is satisfied, the grouping unit 12 causes the two faces to be processed to belong to the same group. The predetermined value can be arbitrarily determined in advance.

For example, in a case where the distance between the coordinates of the 2-1 face detected from the second image and the coordinates of the 1-1 face detected from the first image satisfies the distance condition, the grouping unit 12 causes the 2-1 face to belong to the same group as the 1-1 face. For example, the same group ID is associated with the face ID of the 1-1 face and the face ID of the 2-1 face (see FIG. 6).

Further, in a case where the 2-2 face detected from the second image does not satisfy the distance condition with any of the faces detected from the first image, the grouping unit 12 generates a new group, and causes the 2-2 face to belong to the group. For example, a new group ID is generated, and the group ID is associated with the face ID of the 2-2 face (see FIG. 6).

The grouping unit 12 performs the above processing on all pairs of the N-th image and the (N+1)-th image captured immediately after that to group a plurality of faces.

"Method 2"

The grouping unit 12 causes one or more faces detected from the first image that is the image to be processed first (for example, the first captured image) among the plurality of images to be processed to belong to different groups. For example, a different group ID is associated with the face ID of each face detected from the first image and stored in a storage medium such as a memory. In a case where M faces (M is an integer equal to or greater than 1) are detected from the first image, the grouping unit 12 generates M groups, and causes each of the M faces to belong to each group. For example, M new group IDs are generated, and a different group ID is associated with the ID of each of the M faces detected from the first image (see FIG. 6).

Thereafter, the grouping unit 12 computes the distance in the x-axis direction and the distance in the y-axis direction of each of the one or more faces detected from the first image and one or more faces detected from the second image captured immediately after the first image, on the basis of the coordinates in the vehicle coordinate system. Then, the grouping unit 12 causes two faces that satisfy the distance condition "the distance in the x-axis direction is less than the first predetermined value and the distance in the y-axis direction is less than the second predetermined value" to belong to the same group. That is, in a case where the distance condition is satisfied, the grouping unit 12 causes the two faces to be processed to belong to the same group. The first predetermined value and the second predetermined value can be arbitrarily determined in advance.

For example, in a case where the 2-1 face detected from the second image and the 1-1 face detected from the first image satisfy the distance condition, the grouping unit 12 causes the 2-1 face to belong to the same group as the 1-1 face. For example, the same group ID is associated with the face ID of the 1-1 face and the face ID of the 2-1 face (see FIG. 6).

Further, in a case where the 2-2 face detected from the second image does not satisfy the distance condition with any of the faces detected from the first image, the grouping unit 12 generates a new group, and causes the 2-2 face to belong to the group. For example, a new group ID is generated, and the group ID is associated with the face ID of the 2-2 face (see FIG. 6).

The grouping unit 12 performs the above processing on all pairs of the N-th image and the (N+1)-th image captured immediately after that to group a plurality of faces.

"Method 3"

The grouping unit 12 causes one or more faces detected from the first image that is the image to be processed first (for example, the first captured image) among the plurality of images to be processed to belong to different groups. For example, a different group ID is associated with the face ID of each face detected from the first image and stored in a storage medium such as a memory. In a case where M faces (M is an integer equal to or greater than 1) are detected from the first image, the grouping unit 12 generates M groups, and causes each of the M faces to belong to each group. For example, M new group IDs are generated, and a different group ID is associated with the ID of each of the M faces detected from the first image (see FIG. 6).

Then, the grouping unit 12 determines representative coordinates for each group. At the timing when the number of members is 1, for example, the coordinates of the member are set as the representative coordinates of each group. The member is a face belonging to each group, that is, a face determined by a face ID associated with each group ID. The number of face IDs associated with the same group ID is the number of members. The coordinates of a member are the coordinates of each face in the vehicle coordinate system.

Thereafter, the grouping unit 12 computes the distance between the representative coordinates of each of the plurality of groups and the coordinates of a person who does not belong to the group. That is, the grouping unit 12 computes the distance between each of one or more faces detected from the second image captured immediately after the first image and the representative coordinates of each of the M groups. Then, the grouping unit 12 causes the face which does not belong to the group to a predetermined group, according to the comparison between the computed distance and a predetermined value. That is, the grouping unit 12 causes the one or more faces detected from the second image to belong to a group that satisfies the distance condition "the distance is less than a predetermined value". For example, the group ID of the group that satisfies the distance condition is associated with the face ID of each of the one or more faces detected from the second image (see FIG. 6). The predetermined value can be arbitrarily determined in advance.

Thereafter, the grouping unit 12 re-determines the representative coordinates of the group to which the new member has been added. As a method of determining the representative coordinates when there are a plurality of members, for example, an example in which a statistical value (for example, average) of the x coordinates of the plurality of members is set as the x coordinate of the representative coordinates, and a statistical value (for example, average) of the y coordinates of the plurality of members is set as the y coordinate of the representative coordinates is exemplified, but the present invention is not limited to this.

It should be noted that, in a case where there is no group that satisfies the distance condition, the grouping unit 12 generates a new group corresponding to the face detected from the second image, and causes the face to belong to the group. For example, a new group ID is generated, and the group ID is associated with the face ID of the face (see FIG. 6). Further, the grouping unit 12 sets the coordinates of the face as the representative coordinates of the group.

The grouping unit 12 performs the above processing on all of the plurality of images to be processed, and groups a plurality of faces.

As described above, the grouping unit 12 can compute the distance between the representative coordinates of each of a plurality of groups to which one or more faces belong and the faces that do not belong to the group on the basis of the coordinates in the vehicle coordinate system, and cause the faces that do not belong to the group to belong to a group that satisfies the distance condition "distance is less than a predetermined value".

"Method 4"

The grouping unit 12 causes one or more faces detected from the first image that is the image to be processed first (for example, the first captured image) among the plurality of images to be processed to belong to different groups. For example, a different group ID is associated with the face ID of each face detected from the first image and stored in a storage medium such as a memory. In a case where M faces (M is an integer equal to or greater than 1) are detected from the first image, the grouping unit 12 generates M groups, and causes each of the M faces to belong to each group. For example, M new group IDs are generated, and a different group ID is associated with the ID of each of the M faces detected from the first image (see FIG. 6).

Then, the grouping unit 12 determines representative coordinates for each group. At the timing when the number of members is 1, for example, the coordinates of the member are set as the representative coordinates of each group.

Thereafter, the grouping unit 12 computes the distance between the representative coordinates of each of the plurality of groups and the coordinates of a person who does not belong to the group. That is, the grouping unit 12 computes the distance in the x-axis direction and the distance in the y-axis direction between each of one or more faces detected from the second image captured immediately after the first image and the representative coordinates of each of the M groups. Then, the grouping unit 12 causes the one or more faces detected from the second image to belong to the group that satisfies the distance condition "the distance in the x-axis direction is less than the first predetermined value and the distance in the y-axis direction is less than the second predetermined value". For example, the group ID of the group that satisfies the distance condition is associated with the face ID of each of the one or more faces detected from the second image (see FIG. 6). The first predetermined value and the second predetermined value can be arbitrarily determined in advance.

Thereafter, the grouping unit 12 re-determines the representative coordinates of the group to which the new member has been added. As a method of determining the representative coordinates when there are a plurality of members, for example, an example in which a statistical value (for example, average) of the x coordinates of the plurality of members is set as the x coordinate of the representative coordinates, and a statistical value (for example, average) of the y coordinates of the plurality of members is set as the y coordinate of the representative coordinates is exemplified, but the present invention is not limited to this.

It should be noted that, in a case where there is no group that satisfies the distance condition, the grouping unit 12 generates a new group corresponding to the face detected from the second image, and causes the face to belong to the group. For example, a new group ID is generated, and the group ID is associated with the face ID of the face (see FIG. 6). Further, the grouping unit 12 sets the face coordinates as the representative coordinates of the group.

The grouping unit 12 performs the above processing on all of the plurality of images to be processed, and groups a plurality of faces.

As described above, the grouping unit 12 can compute the distance in the x-axis direction and the distance in the y-axis direction between the representative coordinates of each of a plurality of groups to which one or more faces belong and the faces that do not belong to the group, on the basis of the coordinates in the vehicle coordinate system, and cause the faces that do not belong to the group to belong to a group that satisfies the distance condition "the distance in the x-axis direction is less than the first predetermined value and the distance in the y-axis direction is less than the second predetermined value".

Returning to FIG. 2, the counting unit 13 counts the number of groups. For example, the number of group IDs is counted using data as shown in FIG. 6. The analysis apparatus 10 outputs the number of groups as the number of persons on the vehicle. For example, the analysis apparatus 10 stores the count number in the storage device in association with the image or the like.

Thereafter, in response to a user operation, the analysis apparatus 10 may extract, from the storage device, the image obtained by capturing a vehicle on which the number of persons does not satisfy a predetermined condition (for example, such as two persons or more, three persons or more, or four persons or more), and output the extracted image.

Figure 7:
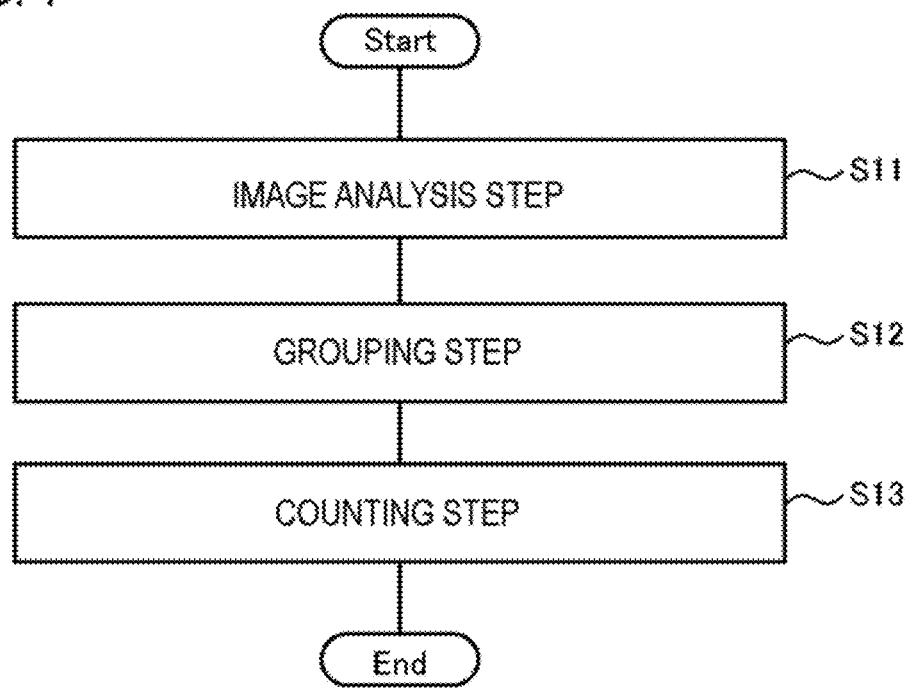
FIG. 7 is a flowchart showing an example of a process flow of the analysis apparatus of the present example embodiment.

Next, an example of the processing flow of the analysis apparatus 10 of the present example embodiment will be described with reference to the flowchart of FIG. 7.

In the image analysis step of S11, the image analysis unit 11 sets a plurality of images obtained by imaging the same vehicle a plurality of times from different directions as processing targets and detects a predetermined part of the vehicle and persons (for example, faces) on the vehicle from each of the plurality of images. Then, the image analysis unit 11 detects the coordinates of each of a plurality of persons (for example, the coordinates of each of a plurality of faces) in a coordinate system (vehicle coordinate system) with the detected predetermined part of a vehicle as a reference (for example, the origin). The plurality of images are, for example, images captured by the camera 102 illustrated in FIG. 3 and images continuously captured by the camera 102 in response to one detection by the sensor 101.

In the grouping step of S12, the grouping unit 12 groups persons (for example, faces) detected from different images, on the basis of the coordinates in the vehicle coordinate system. The grouping unit 12 groups together persons having coordinates close to each other in the vehicle coordinate system. Thereby, the faces of the same person existing across a plurality of images are grouped.

In the counting step of S13, the counting unit 13 counts the number of groups. The analysis apparatus 10 outputs the number of groups as the number of persons on the vehicle. For example, the analysis apparatus 10 stores the count number in association with the image or the like.

Next, the advantageous effect of the present example embodiment will be described.

According to the analysis apparatus 10 of the present example embodiment, the detection result (the number of occupants) can be determined on the basis of the analysis results of each of the plurality of images.

For example, even when three persons A, B, and C are on the vehicle, in the first image captured at the first timing, the person A may be hidden by an obstacle (a part of the vehicle, other occupants, or the like) and may not be included in the image. However, when images are captured at different timings, the vehicle moves and the positional relationship between the camera, the person A, and the obstacles changes, so the person A that is not included at the first timing may be included in the image.

According to the analysis apparatus 10 of the present example embodiment, even when at least a part of the occupants is not included in a determined image due to the positional relationship between the camera, the person, and the obstacle, the detection result is determined on the basis of the analysis results of the plurality of images, which increases the possibility of counting all the persons on the vehicle. As a result, detection accuracy is improved.

Further, in the case of the analysis apparatus 10 according to the present example embodiment, "for each detected face, the coordinates in a vehicle coordinate system having a detected predetermined part of a vehicle as an origin may be detected, and faces having coordinates close to each other may be grouped", so it is not necessary to detect "seat where each detected person is sitting" as the technique disclosed in Patent Document 2. The seating layout in a vehicle differs depending on the vehicle and the vehicle type, and when the information on the seating layout held in advance is used, the accuracy of detecting the number of occupants may not be sufficient. According to the analysis apparatus of the present example embodiment, the accuracy of detecting the number of occupants is improved as compared with the technique disclosed in Patent Document 2.

Second Example Embodiment

An analysis apparatus 10 of the present example embodiment is different from the first example embodiment in the functional configuration of the image analysis unit 11 and the grouping unit 12. This will be described below.

The hardware configuration of the analysis apparatus 10 is the same as that in the first example embodiment.

FIG. 2 shows an example of a functional block diagram of the analysis apparatus 10 of the present example embodiment. As illustrated, the analysis apparatus 10 includes an image analysis unit 11, a grouping unit 12, and a counting unit 13. The configuration of the counting unit 13 is the same as in the first example embodiment.

The image analysis unit 11 has a function of extracting a feature value of a human face image included in the image. "A person included in an image" means a person detected from an image by image analysis.

When there is a person (hereinafter, sometimes referred to as "first person") having a plurality of groups to which the person is determined to belong on the basis of the distance condition, the grouping unit 12 determines the group to which the first face belongs, on the basis of the feature value of the image of the face of the first person (hereinafter, sometimes referred to as "first face") and the feature value of the image of the face belonging to each group. That is, the first person is a person who belongs, according to a comparison between the distance and the predetermined value, to a plurality of groups.

First, a case where grouping processing is performed by the methods 1 and 2 described in the first example embodiment will be described.

In the methods 1 and 2, the grouping unit 12 causes each of one or more faces detected from the second image to belong to the same group as the group that satisfies the distance condition among one or more faces detected from the immediately preceding first image.

In a case where there is a plurality of faces satisfying the above distance condition (faces detected from the first image) with respect to one face detected from the second image, the face detected from the second image is the first face. In this case, the grouping unit 12 determines a group to which the first face belongs, on the basis of the feature value of the face image.

For example, it is assumed that the 2-1 face detected from the second image satisfies the above distance condition with two faces of the 1-1 face and the 1-2 face detected from the first image. In this case, the image analysis unit 11 extracts the feature value of the image of each of the 1-1 face, the 1-2 face, and the 2-1 face. Then, the grouping unit 12 collates the feature value of the 2-1 face image with the feature value of the 1-1 face image. Similarly, the grouping unit 12 collates the feature value of the 2-1 face image with the feature value of the 1-2 face image.

Then, the grouping unit 12 causes the 2-1 face to belong to the same group as the group of the 1-1 face or the 1-2 face which is more similar to the 2-1 face. That is, as a result of the collation, the 2-1 face belongs to the same group as the group of the face having the higher similarity with the feature value of the image of the 2-1 face. For example, in a case where the face having the higher similarity to the feature value of the image of the 2-1 face is the 1-1 face, the same group ID is associated with the face ID of the 1-1 face and the face ID of the 2-1 face (see FIG. 6).

It should be noted that, when the similarity of any of the 1-1 face and the 1-2 face to the 2-1 face does not exceed a predetermined threshold, the grouping unit 12 may cause the 2-1 face to belong to a new group. That is, the 2-1 face may belong to a different group from both the 1-1 face and the 1-2 face. For example, the grouping unit 12 generates a new group ID, and associates the group ID with the face ID of the 2-1 face (see FIG. 6).

As described above, in a case where there is the first face, the image analysis unit 11 extracts the feature value of the image of each of the first face and the plurality of faces that satisfy the distance condition with respect to the first face. It should be noted that, the image analysis unit 11 may not extract feature values of other face images. Then, the grouping unit 12 determines whether or not to cause the first face to belong to any group, on the basis of the similarity of the feature value of the face image.

Next, a case where the grouping processing is performed by the methods 3 and 4 described in the first example embodiment will be described.

In the methods 3 and 4, the grouping unit 12 causes each of one or more faces detected from any image to belong to a group of which the representative coordinates satisfying the distance condition with the face, among the plurality of groups present at that time.

Then, in a case where there is a plurality of groups satisfying the above distance condition with respect to one face detected from any image, the face detected from the image is the first face. In this case, the grouping unit 12 determines a group to which the first face belongs, on the basis of the feature value of the face image. Specifically, the grouping unit 12 causes the first face to belong to the group whose member face is most similar to the first face, among the plurality of groups that satisfy the above distance condition with the first face.

It should be noted that, in a case where a plurality of groups satisfying the above distance condition with the first face have a plurality of members, the grouping unit 12 can decide a representative member from the group, and determine the degree of similarity between the decided representative member and the first face. The grouping unit 12 can determine the representative member, on the basis of the imaging timing of the image including the first person. For example, the grouping unit 12 may use, as a representative member, a member included in an image having the closest imaging timing to an image including the first face, among a plurality of members. In addition, a member included in an image captured within a predetermined time from an imaging timing of an image including the first person or a member included in an image captured within a predetermined number of frames from the image including the first person may be used as a representative member.

It is preferable that the predetermined time and the predetermined number of frames are small. In a case where the imaging timings are close to each other, there is a high possibility that faces are captured in the same direction and the same facial expression. Therefore, it can be accurately determined whether or not they are the same person.

Other configurations of the image analysis unit 11 and the grouping unit 12 are the same as those in the first example embodiment.

According to the analysis apparatus 10 of the present example embodiment described above, the same advantageous effects as that of the first example embodiment can be realized.

Further, according to the analysis apparatus 10 of the present example embodiment, in the process of grouping the same person across a plurality of images, in a case where there is a face (first face) for which a group to belong cannot be determined on the basis of the distance condition, the group to which the face belongs can be determined on the basis of the feature value of the face image.

That is, according to the analysis apparatus 10 of the present example embodiment, the same person across a plurality of images is grouped using the distance condition preferentially, and the feature value of the face image is used only when a group cannot be determined by the distance condition. Such an analysis apparatus 10 according to the present example embodiment can reduce the processing load on the computer, as compared with the process of grouping only by the feature value of the face image, without using the distance condition. Further, the accuracy of grouping is improved as compared with the process of grouping only by the distance condition without using the feature value of the face image.

Further, according to the analysis apparatus 10 of the present example embodiment, even when grouping by any of the above methods 1 to 4, the process of determining whether the first face and the image are similar to each other can be performed with the face included in the image having an imaging timing close to that of the image including the first face. In a case where the imaging timings are close to each other, there is a high possibility that the face orientation, facial expression, or the like are the same or not changed much, as compared with a case where imaging timings are far from each other. Therefore, it is possible to accurately detect a group to which a face similar in image to the first face belongs, and to cause the first face to belong to the group.

Third Example Embodiment

First, problems to be solved by the analysis apparatus 10 of the present example embodiment will be described. The image processed by the analysis apparatus 10 is captured from the side of the vehicle as shown in FIG. 3. Imaging may be performed from diagonally forward, from the side, or from diagonally back. The direction of imaging can be adjusted by adjusting the direction of the optical axis of the camera.

In the present example embodiment, a moving vehicle is imaged with the camera orientation fixed. Therefore, the relative relationship between the optical axis of the camera and the vehicle at the imaging timing changes for each image. Then, the horizontal distance between two persons arranged side by side in the vehicle in the image (for example, the driver's seat and the front passenger seat, or neighboring back seats) looks different for each image.

Figure 8:
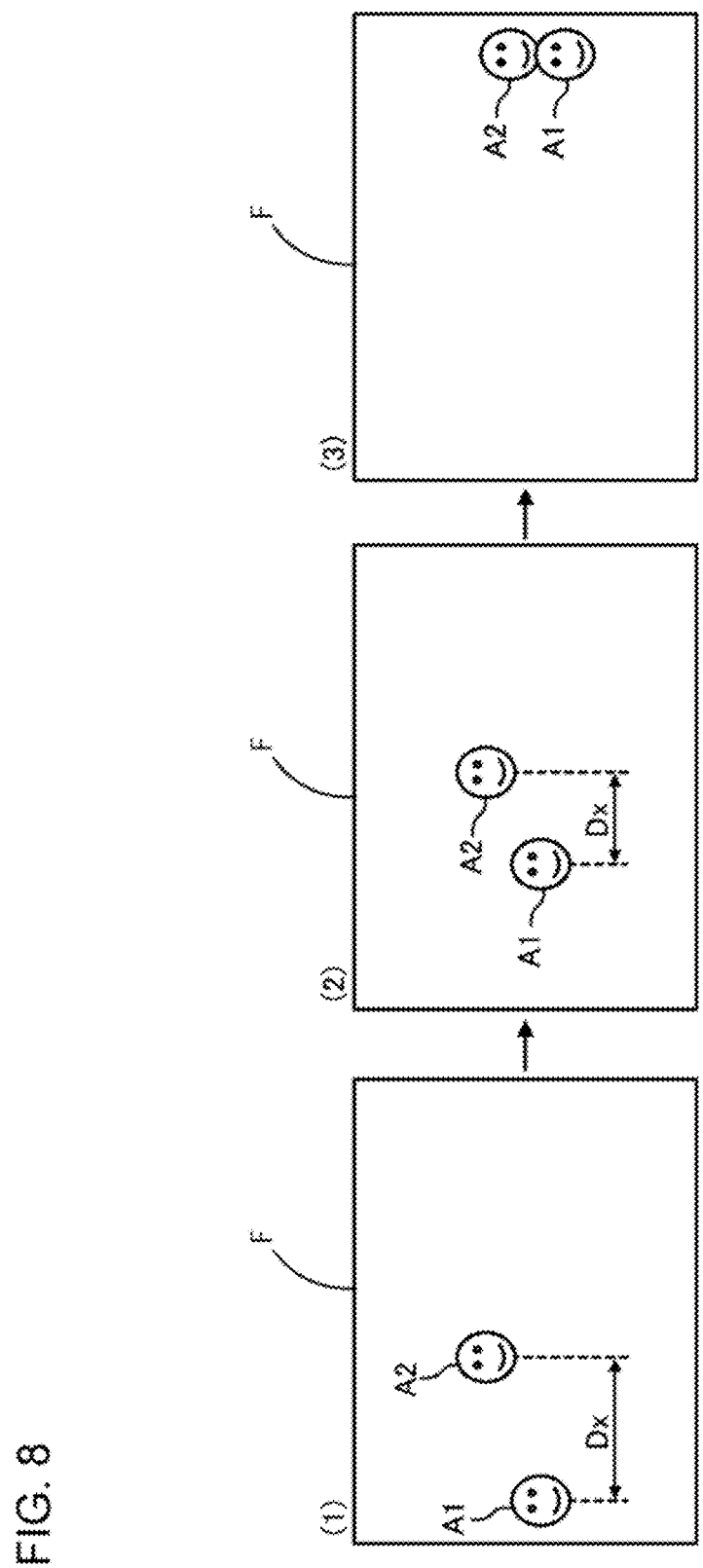
FIG. 8 is a diagram for explaining an example of a problem to be solved by the analysis apparatus of the present example embodiment.

An example will be described with reference to FIG. 8. FIG. 8 shows three images F captured continuously. The imaging order is indicated by arrows. In FIG. 8, a transition of how two persons (persons A1 and A2) arranged side by side in the vehicle are captured is shown. In FIG. 8, only the faces of the two persons are extracted and shown, and the others such as the vehicle are omitted. It should be noted that, the traveling direction of the vehicle is from the left to the right in FIG. 8. The positions of the persons A1 and A2 (vehicle positions) in the image move from left to right as shown in FIG. 8 ((1)→(2)→(3)).

FIG. 8 is an example of the case of imaging a vehicle from diagonally forward. In a case where the vehicle is imaged from diagonally forward, the positional relationship between the vehicle and the camera during continuous imaging (while the vehicle is included in the images) gets close to each other over time. Accordingly, the horizontal distance Dx between the persons A1 and A2 in the image gradually decreases.

Although not illustrated, in a case where the vehicle is imaged from diagonally back, the positional relationship between the vehicle and the camera while the image is being captured (while the vehicle is included in the images) gets farther from each other over time. Accordingly, the horizontal distance Dx between the persons A1 and A2 arranged side by side in the vehicle in the image gradually increases.

Although not illustrated, in a case where the image is captured from the side of the vehicle, the positional relationship between the vehicle and the camera while the image is being captured (while the vehicle is included in the images) gets close to each other over time, and then gets farther from each other. Accordingly, the horizontal distance Dx between the persons A1 and A2 arranged side by side in the vehicle in the image gradually decreases, and then gradually increases.

It should be noted that, in a case where the vehicle is imaged diagonally forward or from diagonally back, depending on how to set the direction of the optical axis of the camera, the positional relationship between the vehicle and the camera while the image is being captured (while the vehicle is included in the images) may get close to each other over time, and then get farther from each other. Then, the horizontal distance Dx between the persons A1 and A2 arranged side by side in the vehicle in the image gradually decreases, and then gradually increases.

The analysis apparatus 10 of the present example embodiment performs the process considering the phenomenon described above, so the accuracy of a process for grouping the same person across a plurality of images on the basis of a distance condition can be improved.

The hardware configuration of the analysis apparatus 10 is the same as those in the first and second example embodiments.

FIG. 2 shows an example of a functional block diagram of the analysis apparatus 10 of the present example embodiment. As illustrated, the analysis apparatus 10 includes an image analysis unit 11, a grouping unit 12, and a counting unit 13. The configuration of the counting unit 13 is the same as in the first and second example embodiments.

The image analysis unit 11 detects a position of each of a plurality of persons (for example, faces) detected from the image, in the image. For example, the image analysis unit 11 detects the coordinates of each of the plurality of faces in a two-dimensional coordinate system in which any position (for example, lower left) of an image is set as an origin, and any directions (for example, horizontal and vertical directions) are set to an x axis and a y axis. An analysis result as shown in FIG. 9 is obtained by the image analysis by the image analysis unit 11 of the present example embodiment. The analysis result of FIG. 9 differs from the analysis result of FIG. 5 described in the first example embodiment in that it has "in-frame coordinates" indicating the position of each face in the frame.

The grouping unit 12 corrects the coordinates, in the vehicle coordinate system, of each of a plurality of persons (for example, faces) detected from the plurality of images, on the basis of the position (in-frame coordinates) of each of the persons (for example, faces) in the images, and groups the plurality of persons (for example, faces), on the basis of the corrected coordinates. This will be described below.

First, the grouping unit 12 determines whether there is a pair of faces whose distance in the x-axis direction (the horizontal direction of the image) is equal to or less than a predetermined value among the faces detected from one image. If there is a pair, the x coordinates in the vehicle coordinate system (coordinates in the vehicle front-rear direction) of the two faces included in the pair is corrected on the basis of the positions of the two faces in the image. It should be noted that, the predetermined value can be arbitrarily determined in advance.

The correction content corresponds to a representative value (for example, average) of the x-coordinates (the horizontal position of the image) of the in-frame coordinates of the two faces.

In a case where the representative value of the x-coordinates of the in-frame coordinates of the two faces indicates "the position in the image where the distance Dx looks relatively large", the x-coordinate in the vehicle coordinate system is corrected such that the distance Dx becomes small. For example, a predetermined value is added to the x coordinate in the vehicle coordinate system of one face (the smaller value of x), and the predetermined value is reduced from the x coordinate in the vehicle coordinate system of the other face (the larger value of x). The predetermined value can be set according to the representative value of the x-coordinates of the in-frame coordinates.

Further, in a case where the representative value of the x-coordinates of the in-frame coordinates of the two faces indicates "the position in the image where the distance Dx looks relatively small", the x-coordinate in the vehicle coordinate system is corrected such that the distance Dx becomes large. For example, a predetermined value is reduced from the x coordinate in the vehicle coordinate system of one face (the smaller value of x), and the predetermined value is added to the x coordinate in the vehicle coordinate system of the other face (the larger value of x). The predetermined value can be set according to the representative value of the x-coordinates of the in-frame coordinates.

For example, the grouping unit 12 may hold in advance correction information in which correction contents are set according to the representative value of the x coordinates of the in-frame coordinates. Then, the grouping unit 12 may determine the content of correction using correction information, and may perform the determined correction.

The processing of grouping a plurality of faces on the basis of the corrected coordinates in the vehicle coordinate system is the same as the processing of grouping a plurality of faces on the basis of the coordinates in the vehicle coordinate system described in the first and second example embodiments. Further, other configurations of the image analysis unit 11 and the grouping unit 12 are the same as those in the first and second example embodiments.

According to the analysis apparatus 10 of the present example embodiment described above, the same advantageous effects as those of the first and second example embodiments can be realized. Further, according to the analysis apparatus 10 of the present example embodiment, the accuracy of a process for grouping the same person across a plurality of images on the basis of a distance condition can be improved by performing the process considering the phenomenon described above with reference to FIG. 8.

Fourth Example Embodiment

An analysis apparatus 10 of the present example embodiment solves the same problem as that of the third example embodiment by different means. This will be described below.

The hardware configuration of the analysis apparatus 10 is the same as those in the first to third example embodiments.

FIG. 2 shows an example of a functional block diagram of the analysis apparatus 10 of the present example embodiment. As illustrated, the analysis apparatus 10 includes an image analysis unit 11, a grouping unit 12, and a counting unit 13. The configurations of the image analysis unit 11 and the counting unit 13 are the same as in the first and second example embodiments.

The grouping unit 12 groups a plurality of faces detected from the image by the method 2 described in the first example embodiment. That is, the grouping unit 12 computes the distance in the x-axis direction and the distance in the y-axis direction of each of one or more faces detected from the first image and each of one or more faces detected from the second image captured immediately after the first image, on the basis of the coordinates in the vehicle coordinate system, and causes two faces that satisfy the distance condition "the distance in the x-axis direction is less than the first predetermined value and the distance in the y-axis direction is less than the second predetermined value" to belong to the same group.

Then, the grouping unit 12 of the present example embodiment sets the second predetermined value as a fixed value, and sets the first predetermined value as a variable value that is determined on the basis of the position of the face in the image.

For example, when determining whether the first face detected from the first image and the second face detected from the second image satisfy the distance condition, the grouping unit 12 determines a representative value, based on the x-coordinate of the in-frame coordinates of the first face and the x-coordinate of the in-frame coordinates of the second face. For example, the average of the x coordinates of both in-frame coordinates is used as the representative value. It should be noted that, the in-frame coordinates are the same concept as in the third example embodiment.

Then, the grouping unit 12 determines the first predetermined value, based on the representative value of the x coordinates of the in-frame coordinates of the first face and the second face.

In a case where the representative value of the x-coordinates of the in-frame coordinates of the first face and the second face indicates "the position in the image where the distance Dx looks relatively large", the first predetermined value is increased. On the other hand, in a case where the representative value of the x-coordinates of the in-frame coordinates of the first face and the second face indicates "the position in the image where the distance Dx looks relatively small", the first predetermined value is decreased. In this way, the distance condition can be optimized according to how a plurality of persons look in the image.

For example, the grouping unit 12 may hold in advance correspondence information (table, function, or the like) in which the first predetermined value is determined according to the representative value of the x coordinates of the in-frame coordinates of the first face and the second face. Then, the grouping unit 12 may determine the distance condition using the correspondence information.

Other configurations of the grouping unit 12 are the same as those in the first and second example embodiments.

According to the analysis apparatus 10 of the present example embodiment described above, the same advantageous effects as those of the first and second example embodiments can be realized. Further, according to the analysis apparatus 10 of the present example embodiment, the accuracy of a process for grouping the same person across a plurality of images on the basis of a distance condition can be improved by performing the process considering the phenomenon described above with reference to FIG. 8.

Examples of reference aspects will be added below.

1. An analysis apparatus including:
an image analysis unit that detects a predetermined part of a vehicle and persons on the vehicle from each of a plurality of images obtained by imaging the same vehicle from different directions a plurality of times, and detects coordinates of each of the plurality of persons in a coordinate system having the detected predetermined part as a reference;
a grouping unit that groups the persons detected from different images, on the basis of the coordinates; and
a counting unit that counts the number of groups.

2. The analysis apparatus according to 1,
wherein the grouping unit groups the persons detected from the different images, using a distance between the coordinates.

3. The analysis apparatus according to 2,
wherein the grouping unit computes a distance between the coordinates of each of one or more persons detected from a first image and the coordinates of each of one or more persons detected from a second image, and groups the persons detected from the different images, according to a comparison between the distance and a predetermined value.

4. The analysis apparatus according to 2,
wherein the grouping unit computes a distance between representative coordinates of each of the plurality of groups and coordinates of the persons that do not belong to the groups, and groups the persons detected from the different images, according to a comparison between the distance and a predetermined value.

5. The analysis apparatus according to 3 or 4,
wherein in a case where there is a first person, who is a person belonging to the plurality of groups, the grouping unit determines whether or not to cause the first person to belong to any of the groups, on the basis of a feature value of an image of the first person and a feature value of an image of the person belonging to each of the groups.

6. The analysis apparatus according to 5,
wherein the grouping unit determines whether or not to cause the first person to belong to any of the groups, on the basis of a feature value of an image of the person included in the image determined on the basis of an imaging timing of the image including the first person and the feature value of the image of the first person.

7. The analysis apparatus according to any one of 3 to 6,
wherein the image is an image obtained by imaging the vehicle from a side of the vehicle, and
wherein the grouping unit corrects the coordinates of each of the plurality of persons detected from the plurality of images, on the basis of a position of each of the persons in the images, and groups the plurality of persons, on the basis of the corrected coordinates.

8. The analysis apparatus according to any one of 1 to 7,
wherein the image analysis unit detects a human face from the image and detects coordinates of the face in the coordinate system.

9. An analysis method executed by a computer, the method including:
an image analysis step of detecting a predetermined part of a vehicle and persons on the vehicle from each of a plurality of images obtained by imaging the same vehicle from different directions a plurality of times, and detects coordinates of each of the plurality of persons in a coordinate system having the detected predetermined part as a reference;
a grouping step of grouping the persons detected from different images, on the basis of the coordinates; and
a counting step of counting the number of groups.

10. A program causing a computer to function as:
an image analysis unit that detects a predetermined part of a vehicle and persons on the vehicle from each of a plurality of images obtained by imaging the same vehicle from different directions a plurality of times, and detects coordinates of each of the plurality of persons in a coordinate system having the detected predetermined part as a reference;
a grouping unit that groups the persons detected from different images, on the basis of the coordinates; and
a counting unit that counts the number of groups.

The invention claimed is:

1. An analysis apparatus comprising:
at least one memory configured to store one or more instructions; and
at least one processor configured to execute the one or more instructions to:
detect a predetermined part of a vehicle and persons on the vehicle from each of a plurality of images obtained by imaging the same vehicle from different directions a plurality of times, and detect coordinates of each of the plurality of persons in a coordinate system having the detected predetermined part as a reference;
group the persons detected from different images, on the basis of the coordinates;
count the number of groups;
group the persons detected from the different images, using a distance between the coordinates; and
compute a distance between the coordinates of each of one or more persons detected from a first image and the coordinates of each of one or more persons detected from a second image, and group the persons detected from the different images, according to a comparison between the distance and a predetermined value.

2. The analysis apparatus according to claim 1,
wherein the processor is further configured to execute the one or more instructions to determine, in a case where there is a first person, who is a person belonging to the plurality of groups, whether or not to cause the first person to belong to any of the groups, on the basis of a feature value of an image of the first person and a feature value of an image of the person belonging to each of the groups.

3. The analysis apparatus according to claim 2,
wherein the processor is further configured to execute the one or more instructions to determine whether or not to cause the first person to belong to any of the groups, on the basis of a feature value of an image of the person included in the image determined on the basis of an imaging timing of the image including the first person and the feature value of the image of the first person.

4. The analysis apparatus according to claim 1,
wherein the image is an image obtained by imaging the vehicle from a side of the vehicle, and
wherein the processor is further configured to execute the one or more instructions to correct the coordinates of each of the plurality of persons detected from the plurality of images, on the basis of a position of each of the persons in the images, and group the plurality of persons, on the basis of the corrected coordinates.

5. The analysis apparatus according to claim 1,
wherein the processor is further configured to execute the one or more instructions to detect a human face from the image and detect coordinates of the face in the coordinate system.

6. A non-transitory storage medium storing a program causing a computer to:
detect a predetermined part of a vehicle and persons on the vehicle from each of a plurality of images obtained by imaging the same vehicle from different directions a plurality of times, and detect coordinates of each of the plurality of persons in a coordinate system having the detected predetermined part as a reference;
group the persons detected from different images, on the basis of the coordinates;
count the number of groups;
group the persons detected from the different images, using a distance between the coordinates; and
compute a distance between the coordinates of each of one or more persons detected from a first image and the coordinates of each of one or more persons detected from a second image, and group the persons detected from the different images, according to a comparison between the distance and a predetermined value.

7. An analysis apparatus comprising:
at least one memory configured to store one or more instructions; and
at least one processor configured to execute the one or more instructions to:
detect a predetermined part of a vehicle and persons on the vehicle from each of a plurality of images obtained by imaging the same vehicle from different directions a plurality of times, and detect coordinates of each of the plurality of persons in a coordinate system having the detected predetermined part as a reference;
group the persons detected from different images, on the basis of the coordinates;
count the number of groups;
group the persons detected from the different images, using a distance between the coordinates; and
compute a distance between representative coordinates of each of the plurality of groups and coordinates of the persons that do not belong to the groups, and group the persons detected from the different images, according to a comparison between the distance and a predetermined value.

8. The analysis apparatus according to claim 7,
wherein the processor is further configured to execute the one or more instructions to determine, in a case where there is a first person, who is a person belonging to the plurality of groups, whether or not to cause the first person to belong to any of the groups, on the basis of a feature value of an image of the first person and a feature value of an image of the person belonging to each of the groups.

9. The analysis apparatus according to claim 8,
wherein the processor is further configured to execute the one or more instructions to determine whether or not to cause the first person to belong to any of the groups, on the basis of a feature value of an image of the person included in the image determined on the basis of an imaging timing of the image including the first person and the feature value of the image of the first person.

10. The analysis apparatus according to claim 7,
wherein the image is an image obtained by imaging the vehicle from a side of the vehicle, and
wherein the processor is further configured to execute the one or more instructions to correct the coordinates of each of the plurality of persons detected from the plurality of images, on the basis of a position of each of the persons in the images, and group the plurality of persons, on the basis of the corrected coordinates.

11. The analysis apparatus according to claim 7,
wherein the processor is further configured to execute the one or more instructions to detect a human face from the image and detect coordinates of the face in the coordinate system.

12. An analysis method comprising:
detecting a predetermined part of a vehicle and persons on the vehicle from each of a plurality of images obtained by imaging the same vehicle from different directions a plurality of times, and detecting coordinates of each of the plurality of persons in a coordinate system having the detected predetermined part as a reference;
grouping the persons detected from different images, on the basis of the coordinates;
counting the number of groups;
grouping the persons detected from the different images, using a distance between the coordinates; and
computing a distance between the coordinates of each of one or more persons detected from a first image and the coordinates of each of one or more persons detected from a second image, and grouping the persons detected from the different images, according to a comparison between the distance and a predetermined value.

13. An analysis method comprising:
detecting a predetermined part of a vehicle and persons on the vehicle from each of a plurality of images obtained by imaging the same vehicle from different directions a plurality of times, and detecting coordinates of each of the plurality of persons in a coordinate system having the detected predetermined part as a reference;
grouping the persons detected from different images, on the basis of the coordinates;
counting the number of groups;
grouping the persons detected from the different images, using a distance between the coordinates; and
computing a distance between representative coordinates of each of the plurality of groups and coordinates of the persons that do not belong to the groups, and grouping the persons detected from the different images, according to a comparison between the distance and a predetermined value.

14. A non-transitory storage medium storing a program causing a computer to:
detect a predetermined part of a vehicle and persons on the vehicle from each of a plurality of images obtained by imaging the same vehicle from different directions a plurality of times, and detect coordinates of each of the plurality of persons in a coordinate system having the detected predetermined part as a reference;

group the persons detected from different images, on the basis of the coordinates;
count the number of groups;
group the persons detected from the different images, using a distance between the coordinates; and
compute a distance between representative coordinates of each of the plurality of groups and coordinates of the persons that do not belong to the groups, and group the persons detected from the different images, according to a comparison between the distance and a predetermined value.

\* \* \* \* \*